(12) United States Patent
Lillywhite et al.

(10) Patent No.: US 9,317,779 B2
(45) Date of Patent: Apr. 19, 2016

(54) TRAINING AN IMAGE PROCESSING NEURAL NETWORK WITHOUT HUMAN SELECTION OF FEATURES

(71) Applicant: Brigham Young University, Provo, UT (US)

(72) Inventors: Kirt Dwayne Lillywhite, Provo, UT (US); Dah-Jye Lee, American Fork, UT (US)

(73) Assignee: Brigham Young University, Provo, UT (US)

( * ) Notice: Subject to any disclaimer, the term of this patent is extended or adjusted under 35 U.S.C. 154(b) by 361 days.

(21) Appl. No.: 13/857,909

(22) Filed: Apr. 5, 2013

(65) Prior Publication Data

US 2013/0266214 A1    Oct. 10, 2013

Related U.S. Application Data

(60) Provisional application No. 61/807,513, filed on Apr. 2, 2013, provisional application No. 61/686,517, filed on Apr. 6, 2012.

(51) Int. Cl.
*G06K 9/62*    (2006.01)
(52) U.S. Cl.
CPC .................................. *G06K 9/6217* (2013.01)

(58) Field of Classification Search
USPC .................................................. 382/156, 159
See application file for complete search history.

(56) References Cited

U.S. PATENT DOCUMENTS

| | | | |
|---|---|---|---|
| 6,553,357 B2 * | 4/2003 | Mathias et al. | 706/25 |
| 6,671,391 B1 * | 12/2003 | Zhang et al. | 382/118 |
| 7,609,893 B2 * | 10/2009 | Luo et al. | 382/224 |
| 7,949,186 B2 * | 5/2011 | Grauman et al. | 382/170 |
| 8,160,396 B2 * | 4/2012 | Brand et al. | 382/294 |
| 8,553,984 B2 * | 10/2013 | Slotine et al. | 382/192 |

* cited by examiner

*Primary Examiner* — Ishrat I Sherali
(74) *Attorney, Agent, or Firm* — Austin Rapp & Hardman

(57) ABSTRACT

A method for training an image processing neural network without human selection of features may include providing a training set of images labeled with two or more classifications, providing an image processing toolbox with image transforms that can be applied to the training set, generating a random set of feature extraction pipelines, where each feature extraction pipeline includes a sequence of image transforms randomly selected from the image processing toolbox and randomly selected control parameters associated with the sequence of image transforms. The method may also include coupling a first stage classifier to an output of each feature extraction pipeline and executing a genetic algorithm to conduct genetic modification of each feature extraction pipeline and train each first stage classifier on the training set, and coupling a second stage classifier to each of the first stage classifiers in order to increase classification accuracy.

20 Claims, 7 Drawing Sheets

TRAINING AN IMAGE PROCESSING NEURAL NETWORK WITHOUT HUMAN SELECTION OF FEATURES

REFERENCE TO RELATED APPLICATIONS

This application claims priority to U.S. Provisional Application No. 61/686,517 entitled "Feature Construction Using Evolution-Constructed Features for General Object Recognition" and filed on 6 Apr. 2012 for Lillywhite et al. and to U.S. Provisional Application No. 61/807,513 entitled "Evolution-Constructed Features for General Object Recognition" and filed on 2 Apr. 2013 for Lillywhite et al. Each of the foregoing Applications are incorporated herein by reference in their entirety.

BACKGROUND OF THE INVENTION

1. Field of the Invention

The claimed invention relates to image processing neural networks in general, and systems and methods for training an image processing neural network without human selection of features in particular.

2. Description of the Related Art

Currently available image processing neural networks require that a user define features that are to be used for general object recognition. Fine tuning of those features is also performed by the user. User interaction allows for human error. Additionally, it excludes objects, which do not have features constructed for them, from being the target of recognition. Each target object must have features that correspond to those selected by the user. Consequently, currently available image processing neural networks are not capable of being trained without human selection of features.

BRIEF SUMMARY OF THE INVENTION

The present invention has been developed in response to the present state of the art, and in particular, in response to the problems and needs in the art that have not yet been fully solved by currently available image processing neural network systems and methods. Accordingly, the claimed inventions have been developed to provide for a system and method for training an image processing neural network that overcome shortcomings in the art.

As detailed herein, a method for training an image processing neural network without human selection of features may include providing a training set including images labeled with two or more classifications, providing an image processing toolbox including a plurality of image transforms, generating a random set of feature extraction pipelines including a sequence of image transforms that are randomly selected from the image processing toolbox and control parameters that are randomly selected and associated with the sequence of image transforms, coupling a first stage classifier to an output of each feature extraction pipeline, and executing a genetic algorithm to conduct genetic modification of each feature extraction pipeline as well as to train each first stage classifier on the training set. Executing a genetic algorithm may include genetic modification such as splicing two feature extraction pipelines and mutating control parameters. The first stage classifier may be a perceptron.

The method for training an image processing neural network without human selection of features may further include coupling each first stage classifier to a second stage classifier and training the second stage classifier on the training set. Training the second stage classifier may include pruning the feature extraction pipelines to a selected set of feature extraction pipelines. The method may also include determining control parameter values for an image transform that do not result in processing errors and limiting the randomly selected control parameters and subsequent genetic modifications to those values. Apparatii corresponding to the above methods are also disclosed herein, as well as illustrative depictions of various aspects of the claimed invention.

It should be noted that references throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

The described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
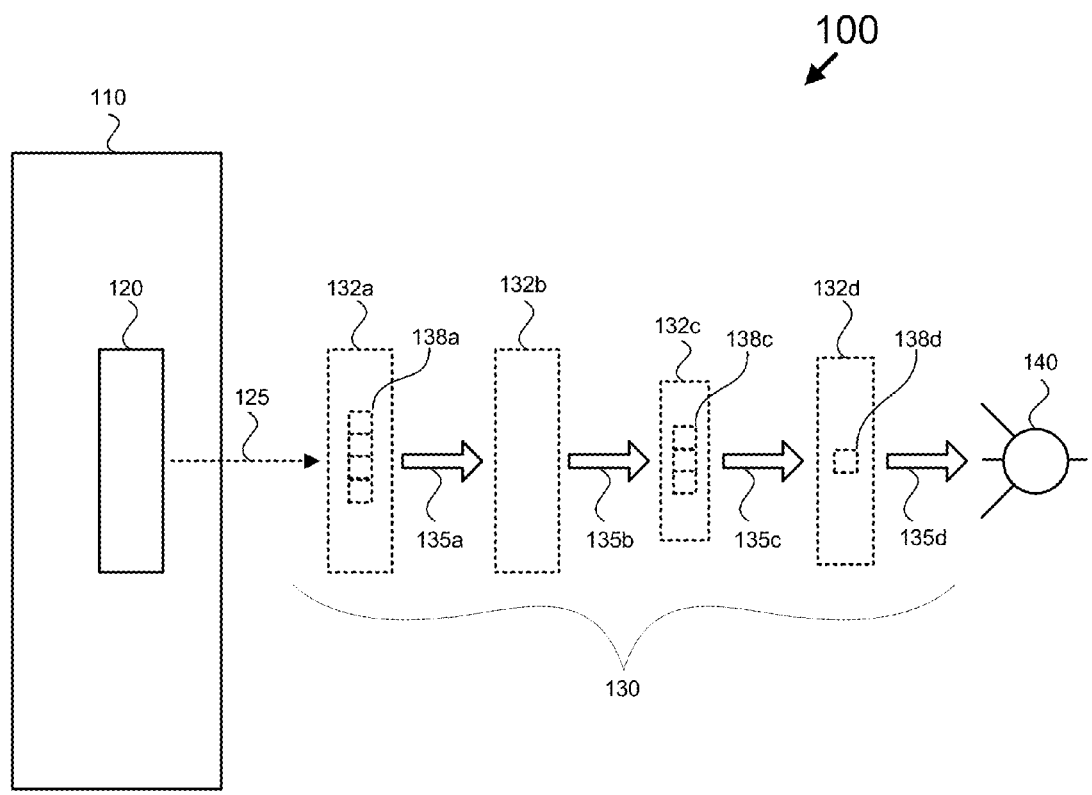
FIG. 1 is a block diagram of one example of an image processing neural network that is consistent with one or more embodiments of the claimed invention.

Some of the functional units described in this specification have been labeled as modules, in order to more particularly emphasize their implementation independence. Others are assumed to be modules. For example, a module or similar unit of functionality may be implemented as a hardware circuit comprising custom VLSI circuits or gate arrays, off-the-shelf semiconductors such as logic chips, transistors, or other discrete components. A module may also be implemented with programmable hardware devices such as field programmable gate arrays, programmable array logic, programmable logic devices or the like.

A module or a set of modules may also be implemented (in whole or in part) as a processor configured with software to perform the specified functionality. An identified module may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module. A module may also be embodied as a server with a service executing thereon.

Indeed, the executable code of a module may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any tangible form capable of enabling execution of a program of machine-readable instructions on a digital processing apparatus. For example, a computer readable medium may be embodied by a flash drive, compact disk, digital-video disk, a magnetic tape, a Bernoulli drive, a magnetic disk, a punch card, flash memory, integrated circuits, or other digital processing apparatus memory device. A digital processing apparatus such as a computer may store program codes, associated data, and the like on the computer readable medium that when retrieved enable the digital processing apparatus to execute the functionality specified by the modules.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 is a block diagram of one example of an image processing neural network 100 that is consistent with one or more embodiments of the claimed invention. As depicted, the image processing neural network 100 includes an image 110, a subregion 120, a transformation path 125, a feature extraction pipeline 130, one or more image transforms 132, one or more output vectors 135, control vectors 138, and a first stage classifier 140. The image processing neural network 100 is one example of an image processing neural network that can process images without human selection of features.

The image 110 may be one image from a set of images. The image or set of images may be stored on a storage device. In one embodiment, the image 110 includes one or more objects to be detected and labeled. A subregion 120 of the image 110, may be selected. The subregion 120 may be selected based on coordinates with $(x_1, y_1)$ being the top left coordinates and $(x_2, y_2)$ being the bottom right coordinates. Selection of the coordinates of the subregion 120 may be random. The subregion 120 is processed through the feature extraction pipeline 128 in the direction of transformation path 125.

The feature extraction pipeline 128 may include one or more image transforms 132. In the depicted embodiment, the feature extraction pipeline 130 includes four image transforms 132. Typically, the feature extraction pipeline 130 includes at least two transforms 132, but less than eight transforms 132.

The feature extraction pipeline 130 may be constructed using a genetic algorithm to create an ordering of image transforms. In one embodiment, the ordering of image transforms 132 in the feature extraction pipeline 130 is initially random. Image transforms that are available to the genetic algorithm may be chosen from an image processing toolbox. In one embodiment, the image processing toolbox is OpenCV. The image processing toolbox may be any image processing library made available to the genetic algorithm.

Image transforms 132 may include control vectors 138. Control vectors 138 may include one or more control parameters. Some image transforms 132 may not have a control vector. The control parameters of control vectors 138 may include values used by the image transforms 132 to create output vectors 135.

The image transform 132a may be applied to the subregion 120 to create output vector 135a. Following the transformation path 125, each image transform in the feature extraction pipeline 130 is applied to the output vector 135 of the previous image transform 132. In the depicted embodiment, image transform 132b would be applied to output vector 135a to create output vector 135b; image transform 132c would be applied to output vector 135b to create output vector 135c; and image transform 132d would be applied to output vector 135c to create output vector 135d. The image processing neural network 100 may include one or more subregions of image 110 and each subregion may be associated with a feature extraction pipeline. Each feature extraction pipeline 130 may vary in the number of image transforms 132. Similarly, each output vector 135 may vary in size.

The output vector 135, or V, of a feature extraction pipeline may be defined as:

$$V = T_n(V_{n-1}, \phi_n),$$
$$V_{n-1} = T_{n-1}(V_{n-2}, \phi_{n-1}),$$
$$\vdots$$
$$V_1 = T_1(I(x_1, y_1, x_2, y_2), \phi_1).$$

Where output vector, V, is created by applying each of n transforms to a subregion, $I(x_1, y_1, x_2, y_2)$, of an image, I. Each transform, $T_i$, of the series is applied to the output of the previous transform, $V_{i-1}$, using the transform parameters in a control vector 138, or $\phi_i$, which are set by the genetic algorithm.

In the depicted embodiment, output vector 135d is the output of the feature extraction pipeline 130. The first stage classifier 140 may be associated with the feature extraction pipeline 130. In one embodiment, each generated feature extraction pipeline is coupled to a first stage classifier.

In the depicted embodiment, output vector 135d is the input to the first stage classifier 140. The first stage classifier 140 may be a perceptron. The first stage classifier 140 may be used to assign a score to the feature extraction pipeline 130.

Figure 2:
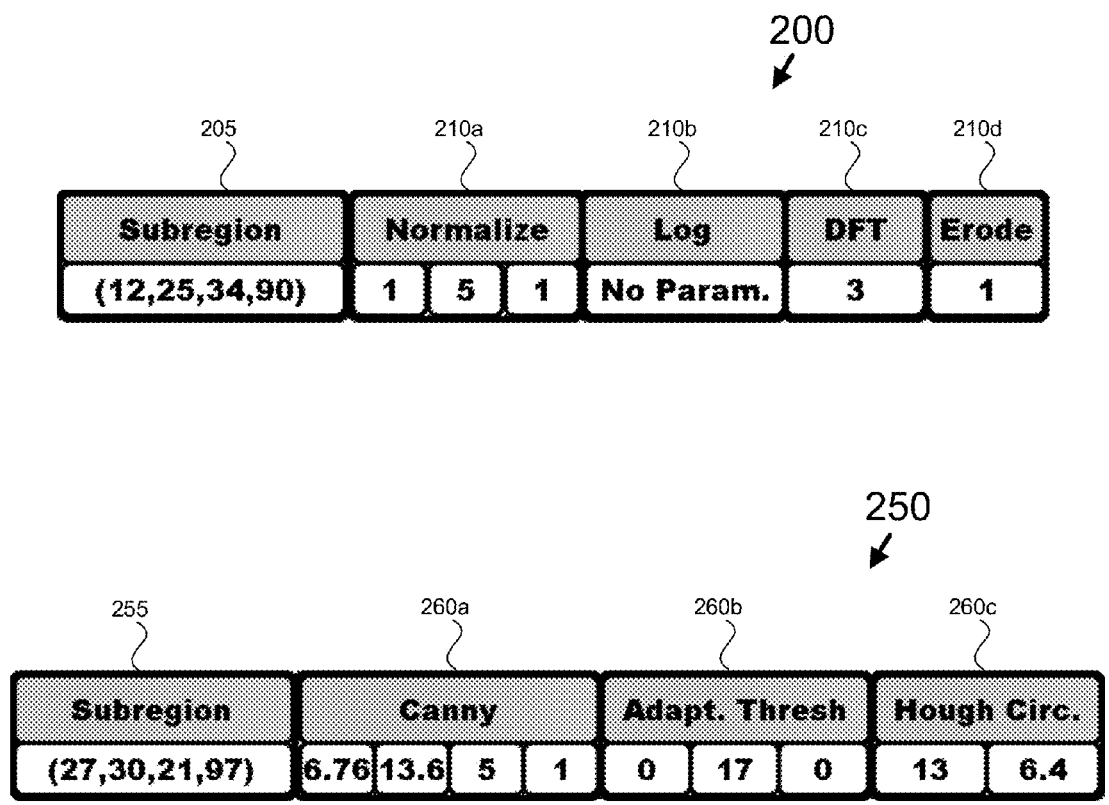
FIG. 2 is a block diagram of two examples of feature extraction pipelines that are consistent with one or more embodiments of the claimed invention.

FIG. 2 is a block diagram of two examples of feature extraction pipelines 200 and 250 that are consistent with one or more embodiments of the claimed invention. As depicted, the feature extraction pipeline 200 includes a subregion 205 and image transforms 210. As depicted, the feature extraction pipeline 250 includes subregion 255 and image transforms 260. The feature extraction pipelines 200 and 250 illustrate two examples of feature extraction pipelines used to train an image processing neural network without human selection of features.

In one embodiment, the subregions 205 and 255 are randomly generated and mutated by a genetic algorithm. Similarly, the image transforms 210 and 260 and parameters associated therewith may be randomly selected and genetically modified by the genetic algorithm. As depicted, the feature extraction pipelines 200 and 250 include a different number of image transforms 210 and 260. Each image transform in the image processing toolbox may also have a particular number of parameters associated therewith.

As depicted, the feature extraction pipeline 200 is applied to the subregion 205 of an image where x1=12, y1=25, x2=34, and y2=90. The image transforms 210 may include parameters that are used when the image transform is applied either to the subregion 205 or output vector of a previous image transform in the feature extraction pipeline.

Figure 3:
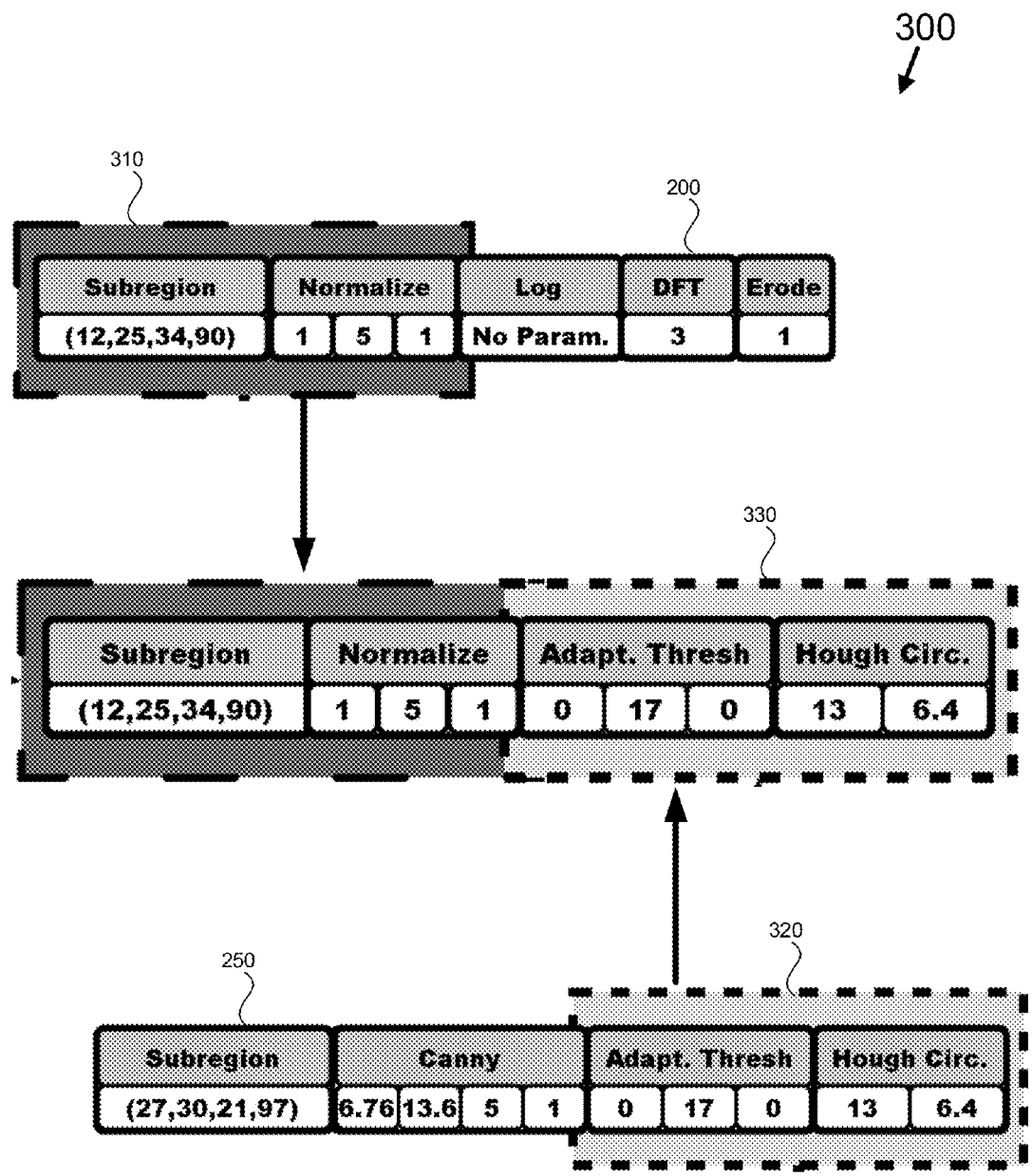
FIG. 3 is a block diagram of one example of feature extraction pipeline splicing that is consistent with one or more embodiments of the claimed invention.

FIG. 3 is a block diagram of one example of feature extraction pipeline splicing 300 that is consistent with one or more embodiments of the claimed invention. As depicted, feature extraction pipeline splicing 300 includes the feature extraction pipeline 200 with a head region 310, the feature extraction pipeline 250 with a tail region 320, and a new feature extraction pipeline 330. The feature extraction pipeline splicing 300 illustrates genetic modification of a feature extraction pipeline through pipeline splicing.

The length (i.e., number of transforms) of the head region 310 may be selected at random by the genetic algorithm. Similarly, the length of the tail region 320 to be spliced to the head region 310 may be randomly selected. As depicted, at least two feature extraction pipelines are required for pipeline splicing. The head region 310 and the tail region 320 are combined to form the new feature extraction pipeline 330. The genetic algorithm may also check to ensure that the new feature extraction pipeline will not produce processing errors and/or limit parameter selection to parameter values that do not produce processing errors. Pipeline splicing may increase or decrease the number of image transforms in a feature extraction pipeline.

Figure 4:
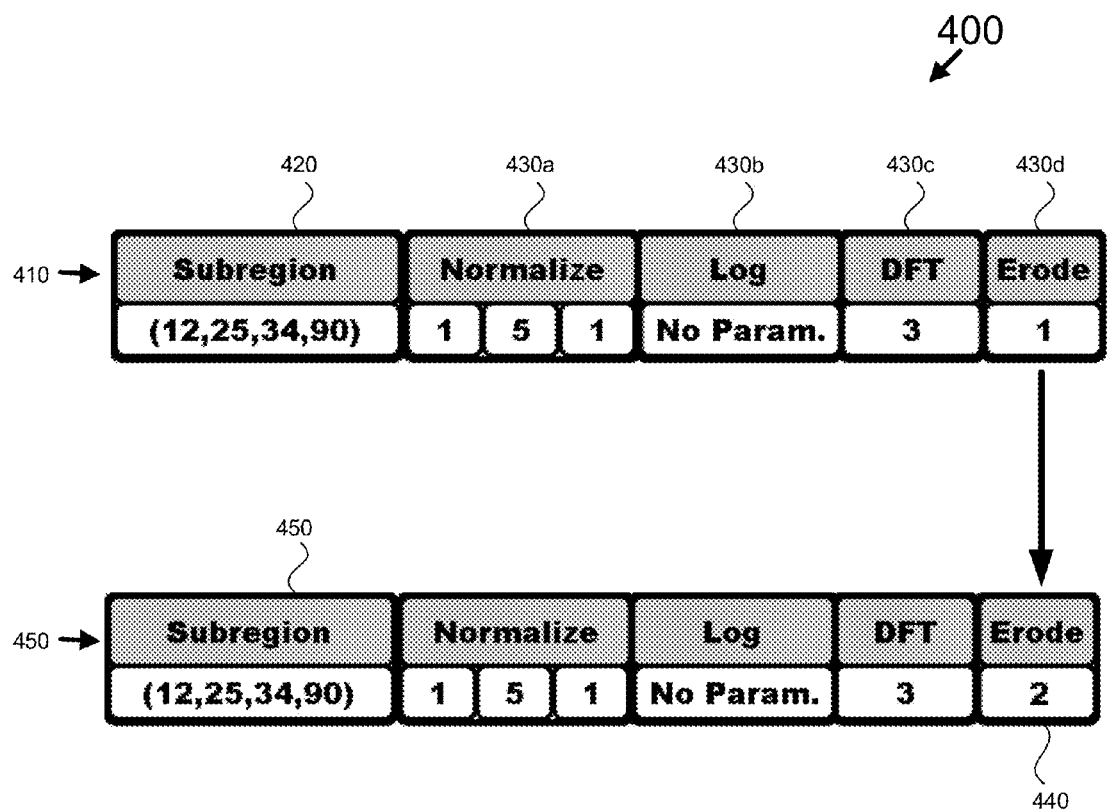
FIG. 4 is a block diagram of one example of parameter mutation that is consistent with one or more embodiments of the claimed invention.

FIG. 4 is a block diagram of one example of parameter mutation 400 that is consistent with one or more embodiments of the claimed invention. As depicted, parameter mutation 400 includes a feature extraction pipeline 410, a subregion 420, image transforms 430, a mutated parameter 440, and a mutated feature extraction pipeline 450. Parameter mutation 400 illustrates genetic modification of a feature extraction pipeline.

Parameter mutation 400 may occur on a control parameter within a control vector 138 for an image transform 132 in a feature extraction pipeline 130 (see FIG. 1). In the depicted embodiment, the parameter of the Erode image transform 430d is changed to create the mutated feature extraction pipeline 450. In one embodiment, parameter mutation 400 is done randomly by the genetic algorithm.

Parameter mutation 400 may generate new solutions for evaluation and selection. The genetic algorithm may check to ensure that the mutated feature extraction pipeline 450 will not produce an error. In one embodiment, the first stage classifier associated with the feature extraction pipeline 410 is discarded in response to parameter mutation and a new first stage classifier is created with its weights zeroed.

Figure 5:
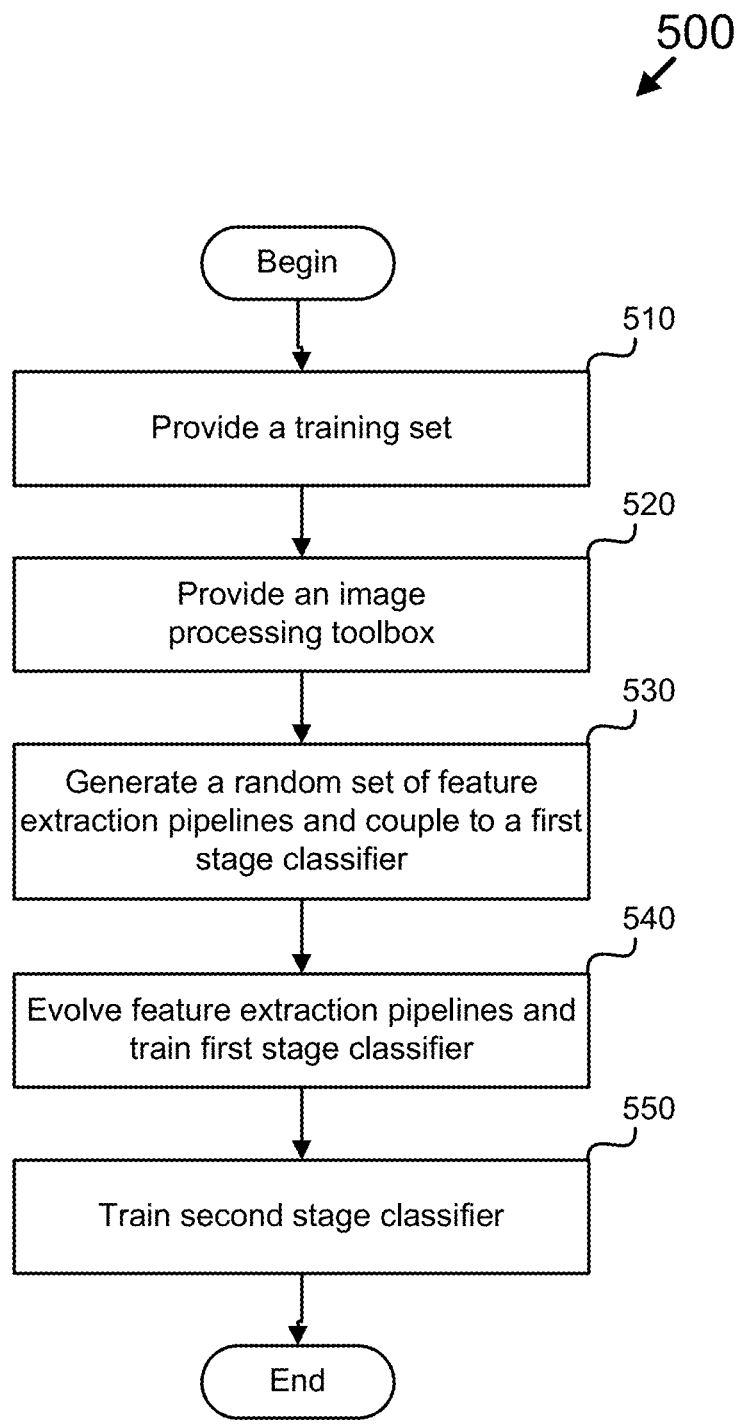
FIG. 5 is a flowchart diagram depicting one example of a method for training an image processing neural network without human selection of features that is consistent with one or more embodiments of the claimed invention.

FIG. 5 is a flowchart diagram depicting one example of a method 500 for training an image processing neural network without human selection of features that is consistent with one or more embodiments of the claimed invention. As depicted, the method 500 includes providing (510) a training set, providing (520) an image processing toolbox, generating (530) a random set of feature extraction pipelines and coupling to a first stage classifier, evolving (540) the feature extraction pipelines and training the first stage classifier, and training (550) a second stage classifier. The method 500 facilitates training an image processing neural network without human selection of features.

Providing (510) a training set may include selecting one or more images displaying one or more objects. The images in the training set may be previously classified and labeled to facilitate training of a neural network. The images in the training set may be selected at random. In one embodiment, the images in the training set are selected from a larger sample of images.

In one embodiment, providing (520) an image processing toolbox presents a repository of image transforms that may be used by the genetic algorithm. The image processing toolbox may be an image processing library such as OpenCV, Cimg or the like.

Generating (530) a random set of feature extraction pipelines may include randomly ordering a group of image transforms selected from the image processing toolbox. Generating (530) may also include randomly selecting a subregion of an image in the training set to apply to the ordered image transforms. A feature extraction pipeline may include the image subregion and the ordered image transforms with the parameters of each image transform. In a preferred embodiment, the length (i.e., number of image transforms) of the feature extraction pipeline is more than two but less than eight.

Generating (530) may include associating a first stage classifier to each feature extraction pipeline generated. In one embodiment, the first stage classifier is a weak classifier. The first stage classifier may be a perceptron. The first stage classifier may be defined by the following equation where α is a binary classification, W is a weight vector, V is an input vector, and b is a bias term.

$$\alpha = \begin{cases} 1 & \text{if } W \cdot V + b > 0 \\ 0 & \text{else.} \end{cases}$$

Evolving (540) the first stage classifier may include sequentially applying each image transform of a particular feature extraction pipeline to produce an output (where the first image transform operates on a subregion of an image and subsequent transforms operate on the output of the previous transform). Evolving (540) the first stage classifier may generate the weight vector W according to the following:

$$\delta = \beta - \alpha,$$

$$W[i] = W[i] + \lambda \cdot \delta \cdot V[i].$$

Where δ is the error found by subtracting the output of the first stage classifier, α, from an actual image classification, β. And the weight vector, W, may be updated according to error, δ, and a learning rate, λ. Evolving (540) the first stage classifier may also include determining a fitness score to reflect how well the first stage classifier classified objects of images in a holding set. Evolving (540) may also include executing a genetic algorithm that genetically modifies the feature extraction pipelines in order to improve classification accuracy.

Training (550) the second stage classifier may include coupling each first stage classifier to a second stage classifier. The second stage classifier may be trained by adaptive boosting. Training (550) the second stage classifier may increase the classification strength of the neural network. In one embodiment, only certain first stage classifiers are permitted to participate in training the second stage classifier. Training (550) the second stage classifier may leverage a list of first stage classifiers and values that indicate how well each first stage classifier performed independent of the second stage classifier.

Figure 6:
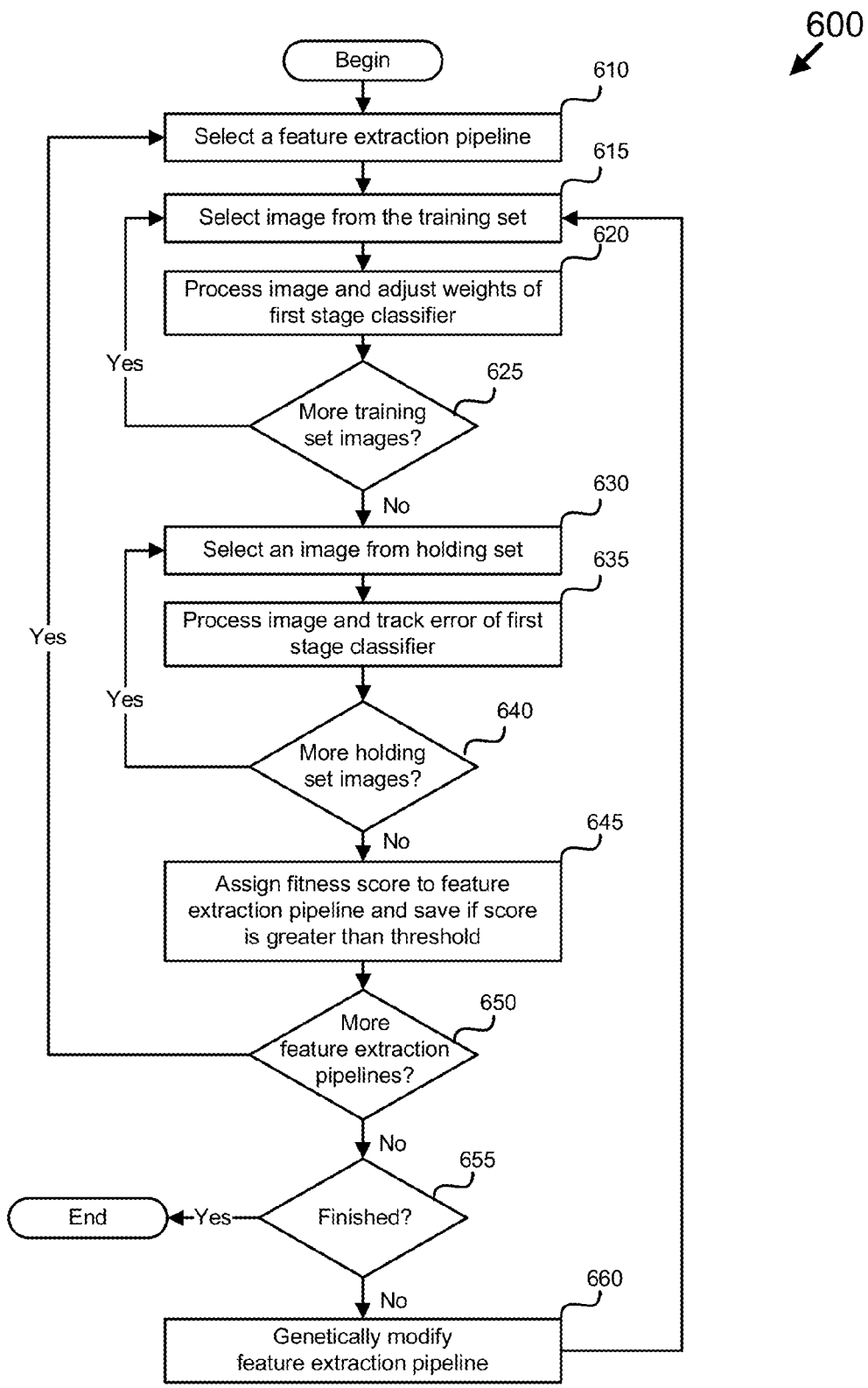
FIG. 6 is a flowchart diagram illustrating one example of a feature extraction pipeline evolution method that is consistent with one or more embodiments of the claimed invention.

FIG. 6 is a flowchart diagram illustrating one embodiment of a feature extraction pipeline evolution method 600 that is consistent with one or more embodiments of the claimed invention. As depicted, the feature extraction pipeline evolution method includes selecting (610) a feature extraction pipeline, selecting (615) an image from the training set, processing (620) the image and adjusting weights of the first stage classifier, determining (625) if more training set images need to be processed, selecting (630) an image from a holding set, processing (635) the image and tracking the error of the first stage classifier, determining (640) if more holding set images need to be processed, assigning (645) a fitness score to the feature extraction pipeline and saving the feature extraction pipeline if the score is greater than a threshold, determining (650) if more feature extraction pipelines need to be processed, determining (655) if the method is finished, and genetically modifying (660) the feature extraction pipeline. The feature extraction pipeline evolution method facilitates genetic modification of feature extraction pipelines and is one example of the evolving step (540) in the training method 500.

Selecting (610) a feature extraction pipeline may include providing a set of feature extraction pipelines to select from. Feature extraction pipelines may be randomly created by the genetic algorithm by selecting coordinates $(x_1, y_1, x_2, y_2)$ defining a subregion of an image and selecting image transforms with parameters, if applicable, to apply to the subregion. Some image transforms may have no parameters. In one embodiment, each feature extraction pipeline in a set of feature extraction pipelines is selected and processed separately.

Selecting (620) an image from the training set may include selecting one image from a set of training images that were previously classified and labeled. The training set may include images with an object therein that is the target for object recognition.

Processing (630) the image and adjusting weights of the first stage classifier may include having the first stage classifier coupled to the feature extraction pipeline. The feature extraction pipeline is used to process each image in the training set. A subregion of the image as identified by the feature extraction pipeline is provided to an ordered series of image transforms in the feature extraction pipeline. The first stage classifier may be weighted with a weight vector. The weight vector may be adjusted according to the error found by subtracting the output of the first stage classifier with the actual image classification and a learning rate. Processing (630) the image and adjusting weights of the first stage classifier may effectively train the first stage classifier.

If more training set images remain to be processed then the method returns to selecting (615) an image from the training set. Selecting (615) an image from the training set may select the next image for processing (620) until all training set images have been processed by the feature extraction pipeline.

If no more training set images remain to be processed, then the method advances to selecting (630) an image from a holding set.

Selecting (630) an image from a holding set may include selecting an image from a subset of images that were withheld from the training set for testing purposes. The holding set may include images with one or more objects that are intended to be classified.

Processing (635) the image and tracking the error of the first stage classifier includes applying a feature extraction pipeline to the image in the holding set. The feature extraction pipeline is used to process each image in the holding set. A subregion of the image as identified by the feature extraction pipeline is applied to an ordered series of image transforms in the feature extraction pipeline. An error of the first stage classifier may be tracked according to the ability of the feature extraction pipeline to classify one or more objects in the subregion. The error may be calculated by subtracting the output of the first stage classifier from the actual image classification.

If more holding set images remain to be processed then the method returns to selecting (630) an image from the holding set. Selecting (630) an image from the holding set may select the next image for processing (635) until all holding set images have been processed by the feature extraction pipeline.

If no more holding set images remain to be processed, then the method advances to assigning (645) a fitness score to the feature extraction pipeline and saving the feature extraction pipeline if the score is greater than a threshold. A fitness score is assigned to reflect how well the first stage classifier classified the holding set. The fitness score may be determined according to the following:

$$s = \frac{t_p \cdot 500}{f_n + t_p} + \frac{t_n + 500}{p \cdot f_p + t_n}$$

Where p is a penalty, $t_p$ is the number of true positives, $f_n$ is the number of false negatives, $t_n$ is the number of true negatives, and $f_p$ is the number of false positives. The fitness score may be an integer in the range of [0, 1000].

A threshold amount may be determined for the fitness score. In one embodiment, the threshold amount is provided by a user as a parameter to the training program. If the fitness score assigned to the feature extraction pipeline exceeds the threshold, the feature extraction pipeline may be added to a pool of feature extraction pipelines to be saved for further processing. In one embodiment, if the fitness score assigned to the feature extraction pipeline exceeds the threshold, the feature extraction pipeline may be a candidate to be selected to train a second stage classifier. The second stage classifier may be an adaptive boosting algorithm.

If more feature extraction pipelines remain for processing, then the method returns to selecting (610) a feature extraction pipeline. Selecting (610) a feature extraction pipeline may select the next feature extraction pipeline.

If no more feature extraction pipelines remain for processing, then the method checks if it is finished. In one embodiment a predetermined number of iterations or generations specifies the number of times to loop through the method before the method may be finished (655). In another embodiment, the method iterates until improvement no longer occurs. If the method is not finished, the method advances to genetically modifying (660) feature extraction pipelines.

Genetically modifying (660) feature extraction pipelines may include creating new feature extraction pipelines through pipeline splicing. Genetically modifying (660) feature extraction pipelines may also include parameter mutation wherein a parameter of an image transform in a feature extraction pipeline is changed. Genetically modifying (660) feature extraction pipelines may create new solutions for testing and evaluation. In one embodiment, new feature extraction pipelines or mutated pipelines are checked to verify they will not produce a processing error. After genetically modifying (660) feature extraction pipelines, the method returns to selecting (615) an image from the training set and loops through the method again.

Figure 7:
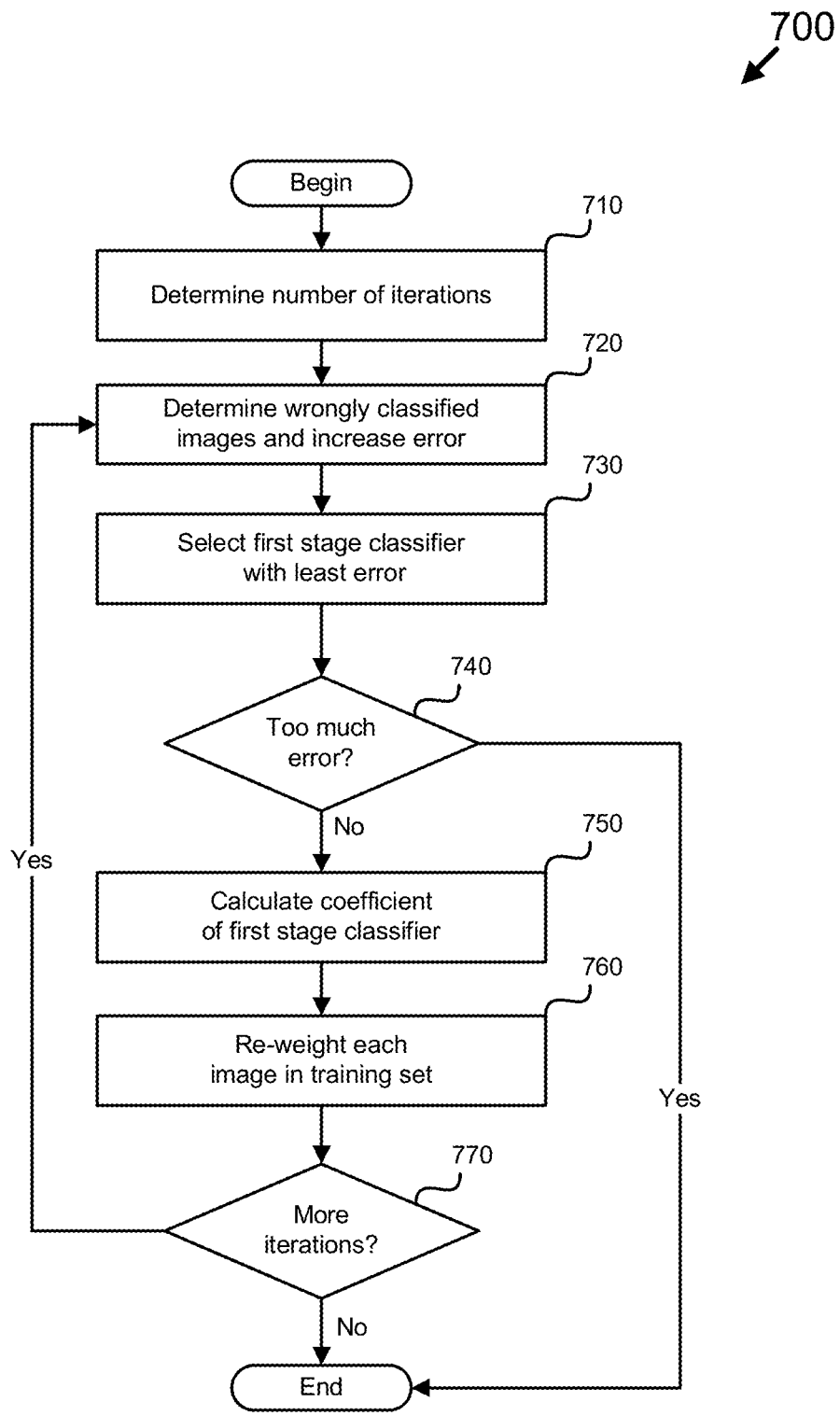
FIG. 7 is a flowchart diagram illustrating one example of a second stage classifier training method that is consistent with one or more embodiments of the claimed invention.

FIG. 7 is a flowchart diagram illustrating one embodiment of a second stage classifier training method 700 that is consistent with one or more embodiments of the claimed invention. As depicted, the second stage classifier training method includes determining (710) a number of iterations, determining (720) wrongly classified images, selecting (730) a first stage classifier with least error, determining (740) if too much error is received, calculating (750) a coefficient of the first stage classifier, re-weighting (760) each image in the training set, and determining (770) if more iterations remain. The second stage classifier training method facilitates creating strong classifiers by combining weak classifiers through an adaptive boosting algorithm.

Determining (710) the number of iterations may include initializing a predetermined number of iterations to perform. In one embodiment, determining (710) the number of iterations may be obtained from the adaptive boosting algorithm. The number of iterations may directly correspond to an amount of feature extraction pipelines, and corresponding first stage classifiers, chosen from a pool of feature extraction pipelines selected by the method 600.

Determining (720) wrongly classified images may include processing each first stage classifier with each training image. If the classification was incorrect, then the error rate of the first stage classifier over the training images may be increased. In one embodiment, the error rate of the first stage classifier is increased by the error rate of the training image. All first stage classifiers may have their error rate adjusted.

Selecting (730) the first stage classifier with the least error may include comparing all first stage classifiers utilized in training the second stage classifier. The first stage classifier that produced the least error over the training set images may be selected. Determining (740) if too much error is received may include comparing the first stage classifier that produced the least amount of error with a maximum tolerable error rate such as 0.5. If the error rate of the first stage classifier with the least error is greater than the maximum tolerable error rate, then the first stage classifiers are considered to be deficient and the second stage classifier training method ends.

If the error rate of the first stage classifier with the least error is less the maximum tolerable error rate, the method progresses to calculating (750) the coefficient of the first stage classifier. The coefficient for the first stage classifier with the least error may be determined to indicate how well the first stage classifier classified the training set. The error of the first stage classifier may be used to calculate the coefficient or weighting of that first stage classifier within the second stage classifier. After all of the training iterations of the second stage classifier, a list of first stage classifiers and weighting coefficients may indicate how well each first stage classifier classified the training set.

Re-weighting (760) each image in the training set may include increasing the weight if the image was classified incorrectly by the first stage classifier with the least error. In one embodiment, re-weighting (760) each image in the training set includes decreasing the weight if the image was classified correctly by the first stage classifier with the least error. If there are more iterations, the method returns to determining (720) wrongly classified images and increasing the error of the first stage classifier.

The claimed invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for training an image processing neural network without human selection of features, the method comprising:
   providing a training set comprising images labeled with two or more classifications;
   providing an image processing toolbox comprising a plurality of image transforms;
   generating a random set of feature extraction pipelines, each feature extraction pipeline comprising a sequence of image transforms randomly selected from the image processing toolbox and randomly selected control parameters associated with the sequence of image transforms;
   coupling a first stage classifier to an output of each feature extraction pipeline; and
   executing a genetic algorithm to conduct genetic modification of each feature extraction pipeline and train each first stage classifier on the training set.

2. The method of claim 1, further comprising coupling each first stage classifier to a second stage classifier and training the second stage classifier.

3. The method of claim 2, wherein training the second stage classifier prunes the feature extraction pipelines to a selected set of feature extraction pipelines.

4. The method of claim 3, further comprising processing images using the selected set of feature extraction pipelines, the first stage classifiers coupled thereto, and the second stage classifier.

5. The method of claim 1, wherein genetic modification comprises pipeline splicing.

6. The method of claim 1, wherein genetic modification comprises mutation of control parameters.

7. The method of claim 1, wherein the first stage classifier is a perceptron.

8. The method of claim 1, wherein the second stage classifier is trained by adaptive boosting.

9. The method of claim 1, further comprising determining control parameters values for an image transform that do not result in processing errors and limiting the randomly selected control parameters and subsequent genetic modifications to those values.

10. An apparatus for processing images, the apparatus comprising:
- a storage device configured to store a training set comprising images labeled with two or more classifications;
- a processor configured to execute an image processing toolbox comprising a plurality of image transforms;
- a plurality of feature extraction pipelines, each feature extraction pipeline comprising a sequence of image transforms; and
- a corresponding plurality of first stage classifiers coupled to the plurality of feature extraction pipelines;
- wherein the plurality of feature extraction pipelines were generated by:
  - generating a random set of feature extraction pipelines, each feature extraction pipeline comprising a sequence of image transforms randomly selected from the image processing toolbox and randomly selected control parameters associated with the sequence of image transforms,
  - coupling a first stage classifier to an output of each feature extraction pipeline, and
  - executing a genetic algorithm to conduct genetic modification of each feature extraction pipeline and train each first stage classifier on the training set.

11. The apparatus of claim 10, further comprising a second stage classifier coupled to each first stage classifier.

12. The apparatus of claim 10, wherein the second stage classifier is trained by adaptive boosting.

13. The apparatus of claim 10, wherein genetic modification comprises pipeline splicing.

14. The apparatus of claim 10, wherein genetic modification comprises mutation of control parameters.

15. The apparatus of claim 10, wherein the first stage classifier is a perceptron.

16. An apparatus for training an image processing neural network without human selection of features, the apparatus comprising:
- a storage device configured to store a training set comprising images labeled with two or more classifications;
- a processor configured to execute an image processing toolbox comprising a plurality of image transforms;
- the processor configured to generate a random set of feature extraction pipelines, each feature extraction pipeline comprising a sequence of image transforms randomly selected from the image processing toolbox and randomly selected control parameters associated with the sequence of image transforms;
- the processor configured to couple a first stage classifier to an output of each feature extraction pipeline; and
- the processor configured to execute a genetic algorithm to conduct genetic modification of each feature extraction pipeline and train each first stage classifier on the training set.

17. The apparatus of claim 16, wherein the processor is configured to couple each first stage classifier to a second stage classifier and train the second stage classifier.

18. The apparatus of claim 17, wherein the processor trains the second stage classifier by adaptive boosting.

19. The apparatus of claim 16, wherein genetic modification comprises pipeline splicing or mutation of control parameters.

20. The apparatus of claim 16, wherein the first stage classifier is a perceptron.

* * * * *